US010229785B2

(12) United States Patent
McConnell et al.

(10) Patent No.: US 10,229,785 B2
(45) Date of Patent: Mar. 12, 2019

(54) MULTI-LAYERED CERAMIC CAPACITOR WITH SOFT LEADED MODULE

(71) Applicant: Kemet Electronics Corporation, Simpsonville, SC (US)

(72) Inventors: John E. McConnell, Simpsonville, SC (US); Alan P. Webster, Simpsonville, SC (US); Lonnie G. Jones, Simpsonville, SC (US); Garry L. Renner, Simpsonville, SC (US); Jeffrey W. Bell, Simpsonville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 881 days.

(21) Appl. No.: 14/096,605

(22) Filed: Dec. 4, 2013

(65) Prior Publication Data

US 2014/0160624 A1 Jun. 12, 2014

Related U.S. Application Data (60) Provisional application No. 61/734,235, filed on Dec. 6, 2012.

(51) Int. Cl.
| | |
|---|---|
| *H01G 4/30* | (2006.01) |
| *H01G 4/38* | (2006.01) |
| *H01G 13/00* | (2013.01) |
| *H01G 4/232* | (2006.01) |

(52) U.S. Cl.
CPC ............... *H01G 4/30* (2013.01); *H01G 4/232* (2013.01); *H01G 4/38* (2013.01); *H01G 13/006* (2013.01); *Y10T 29/43* (2015.01)

(58) Field of Classification Search
CPC ............ H01G 4/30; H01G 4/228; H01G 4/12; H01G 4/005
USPC .......... 361/301.2, 301.4, 306.1, 321.1, 321.2
See application file for complete search history.

(56) References Cited

U.S. PATENT DOCUMENTS

| | | | | |
|---|---|---|---|---|
| 4,847,730 A * | 7/1989 | Konno | ................... | H01F 27/027 333/181 |
| 5,217,388 A * | 6/1993 | Brown | ................... | H01R 4/184 439/455 |
| 6,574,089 B1 * | 6/2003 | Moriwaki | ............... | H01G 4/228 361/306.3 |
| 6,721,163 B2 * | 4/2004 | Iwase | ........................ | H01G 4/30 361/301.4 |
| 7,331,799 B1 * | 2/2008 | Lee | ........................... | H01G 2/06 361/306.3 |
| 8,570,708 B2 * | 10/2013 | Itagaki | ...................... | H01G 4/30 361/301.4 |
| 8,904,609 B2 * | 12/2014 | Bultitude | ................. | H01G 2/16 29/25.03 |
| 8,988,857 B2 * | 3/2015 | McConnell | ............... | H01G 4/30 361/306.3 |
| 2005/0041367 A1 * | 2/2005 | Yoshii | ..................... | H01G 2/065 361/303 |
| 2008/0205020 A1 * | 8/2008 | Vich | ........................ | H01R 4/26 361/807 |

(Continued)

*Primary Examiner* — Nguyen T Ha
(74) *Attorney, Agent, or Firm* — Joseph T. Guy; Patent Filing Specialist, Inc.

(57) ABSTRACT

An improved capacitor utilizing stacked MLCC's is provided. The capacitor comprising at least one MLCC sandwiched between a first lead and a second lead. Each lead comprises at least one integral lead crimp.

48 Claims, 10 Drawing Sheets

(56) References Cited

U.S. PATENT DOCUMENTS

2008/0224166 A1* 9/2008 Glovatsky .............. F21S 48/115
                                                       257/99
2009/0147440 A1* 6/2009 Cygan .................... H01G 4/232
                                                       361/306.3
2011/0043963 A1* 2/2011 Bultitude ................. H01G 2/16
                                                       361/321.4

* cited by examiner

MULTI-LAYERED CERAMIC CAPACITOR WITH SOFT LEADED MODULE

CROSS-REFERENCE TO RELATED APPLICATIONS

The present application claims priority to U.S. Provisional Patent Application No. 61/734,235 filed Dec. 6, 2012, which is incorporated herein by reference.

BACKGROUND

The present invention is related to improvements in the lead module for capacitors, specifically a capacitor formed as a stack of multi-layered ceramic capacitors (MLCC). More specifically, the present invention is related to a lead module which allows for thermal expansion or contraction and allows for remote mounting of the capacitor.

Capacitors formed from stacks of MLCCs are well known through the industry wherein each MLCC includes a stack of internal planer electrodes arranged in parallel fashion with a ceramic there between and wherein the internal planer electrodes are of alternate polarity. External terminations, defined to be cathode or anode, are each in electrical contact with alternate internal electrodes. This construction is well known to those of skill in the art and will not be further described herein.

Stacked MLCC capacitors can be mounted directly to a circuit board either by surface mount technology or leaded through-hole technology. For the purposes of this description there is a desire to mount the stacked MLCC capacitor remotely from the circuit board and to attach them to an independent structure. This attachment option utilizes a soft or flexible lead of a predetermined length which needs to be attached to the terminations of the MLCC's while the opposite end of the leads can be soldered to the circuit board. In doing so, issues such as mechanical lead integrity, joint integrity, lead strain relief, and strain relief between stacks of capacitors within a common module need to be considered in the mechanical design. There is currently no suitable solution for satisfying all of these needs while also maintaining adequate electrical properties.

Provided herein is a lead module for a capacitor, particularly a capacitor formed form a stack of MLCC's, which allows for remote mounting and which allows for thermal expansion or contraction yet adequate electrical properties can be achieved.

SUMMARY

It is an object of the invention to provide an improved capacitor and particularly an improved stacked MLCC capacitor.

It is another object of the invention to provide an improved capacitor, and particularly, an improved stacked MLCC capacitor, with an improved module for lead attachment.

A particular feature of the invention is the ability to attach an MLCC remotely without loss of electrical properties or detrimental impact from thermal variations.

These and other advantages, as will be realized, are provided in a capacitor comprising at least one MLCC sandwiched between a first lead and a second lead. Each lead comprises at least one integral lead crimp.

Yet another embodiment is provided in a method for forming a capacitor comprising:

forming an MLCC stack wherein each MLCC of the MLCC stack comprises a first external termination and a second external termination;
providing a first lead and a second lead wherein each of the first lead and the second lead comprises a first integral crimp;
attaching the first lead to the first external terminations; and
attaching the second lead to the second external terminations.

DESCRIPTION

The present invention is directed to an improved capacitor, and particularly a stacked MLCC capacitor. More particularly, the present invention is directed to an improved module for attachment of soft leads to a capacitor and particularly a capacitor formed from a stack of MLCC's.

The instant invention provides a robust design that can be used with a single capacitor, a stack of capacitors, multiple stacks within a common module, and a single stack of capacitors and with an axial leaded design while providing both a mechanical lead constraint and lead strain relief as well as strain relief between two or more stacks of MLCC's. A particular aspect of the instant invention is a lead frame having an integral lead wire connection having the ability to absorb expansion and contraction associated with exposure to extreme temperatures during processing or in the environment in which the device may operate.

The invention will be described with reference to the figures forming an integral, non-limiting, component of the disclosure. The figures are intended to facilitate an understanding of the invention and are not intended to limit the invention in any way. Throughout the figures various elements will be numbered accordingly.

Figure 21:
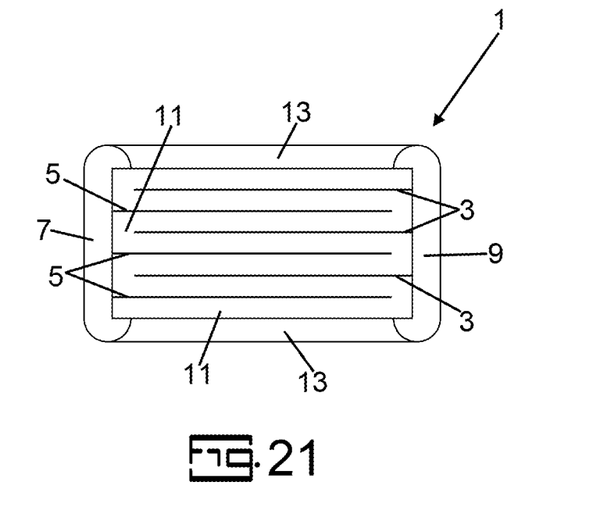
FIG. 21 is a cross-sectional schematic view of an MLCC.

An MLCC is illustrated in cross-sectional schematic view in FIG. 21. In FIG. 21 a conventional multi-layer or stacked ceramic capacitor 1 comprises conductive plates 3, 5 which serve as electrodes. The electrodes are connected to terminations 7, 9 in alternating order. The electrodes are separated or isolated by dielectric ceramic 11. A resin, 13, encases a portion of the capacitor as known in the art.

Figure 1:
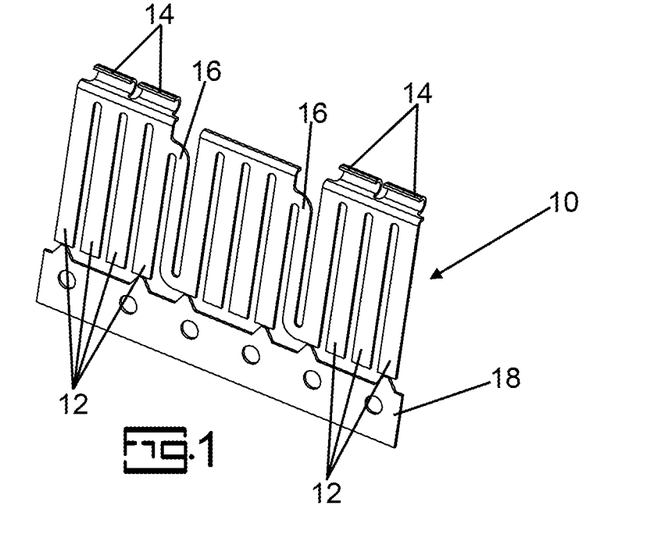
FIG. 1 is a perspective schematic view of a lead of an embodiment of the invention.

An embodiment of the invention is illustrated in schematic perspective view in FIG. 1 wherein a lead frame, 10, is illustrated in perspective view. The lead frame has a multiplicity of electrically connected leads, 12, each of which will be electrically connected to an MLCC, and preferably a single MLCC, as will be further described herein. Integral lead crimp terminals, 14, are in common electrical contact with the leads. The lead crimp terminals can be an electrical attachment to a wire with the attached formed by crimping and soldering to make an electrical connection. Alternatively, the lead crimp terminals can be used for mechanical attachment by a mechanical crimp that is crimped around the insulation of the wire to provide a mechanical constraint with strain relief as will be further realized based on further discussion herein. Integral expansion links, 16, allow for expansion and contraction of the module during thermal cycles where the integral expansion link minimizes mechanical stress between modules. A common rail, 18, physically connects to, preferably, multiple leads. The common rail is for manufacturing convenience and is removed, preferably by being broken away, after module assembly. The number of leads and expansion links is not particularly limited herein. The number of leads between adjacent expansion links is not particularly limited herein.

Figure 2:
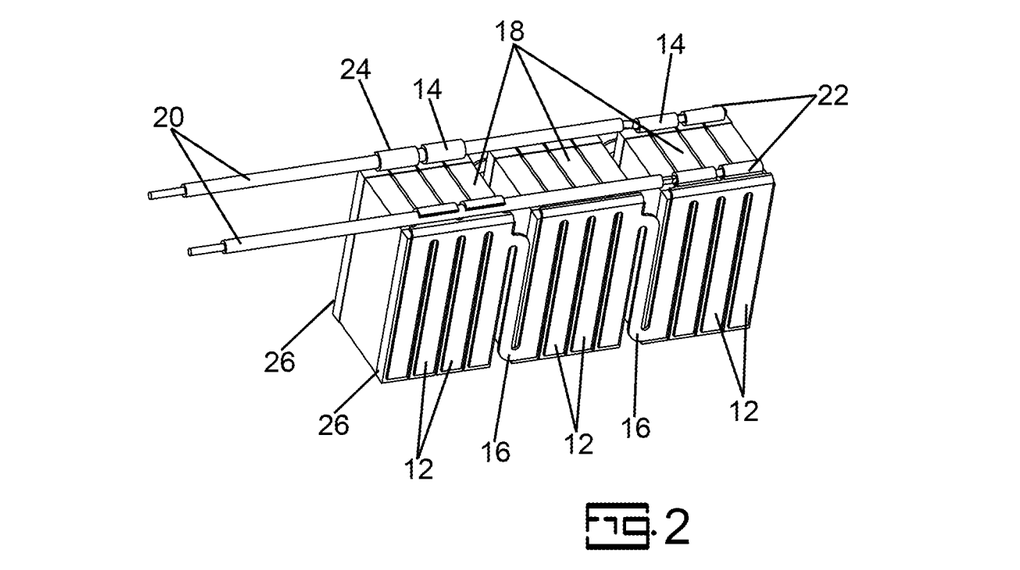
FIG. 2 is a perspective schematic view of an embodiment of the invention.

A particular advantage of the invention will be described with reference to FIG. 2. A capacitor formed from an assembled stack of MLCC's is illustrated schematically in perspective side view in FIG. 2. In FIG. 2 a multiplicity of MLCC's, 18, are combined to form a single capacitor. Each MLCC is attached to a lead, 12, of a lead frame by some form of an electrical bond, 26, such as solder, adhesive conductive or a metallurgical bond thereby forming a sandwich with the MLCC's between parallel lead frames. A wire, 20, is in electrical contact with the lead at an electrical crimp, 22, and optionally at a mechanical crimp, 24. As would be realized an electrical crimp electrically connects the conductor of the wire to the lead frame, and may also be soldered, whereas a mechanical crimp physically connects the lead frame to the insulator of the wire and therefore does not provide any electrical contact. At least one crimp on each lead frame must be an electrical crimp with the mechanical crimp being optional but preferred in some embodiments. All crimps can be electrical crimps if desired. A particular advantage of the invention is the flexibility in size. For convenience, FIG. 2 utilizes three sets of four MLCC's with the expansion links, 16, between the leads attached to the fourth and fifth MLCC and the eight and ninth MLCC which is a non-limited design choice selected for the purposes of illustrating the invention. In one embodiment the leads attached to the fourth and fifth MLCC can be severed on each side thereby providing a single stack of, in this example, four MLCC's and a single stack of eight MLCC's. One of skill in the art would realize the different wire attachment arrangements available and necessary for a given design.

Figure 3:
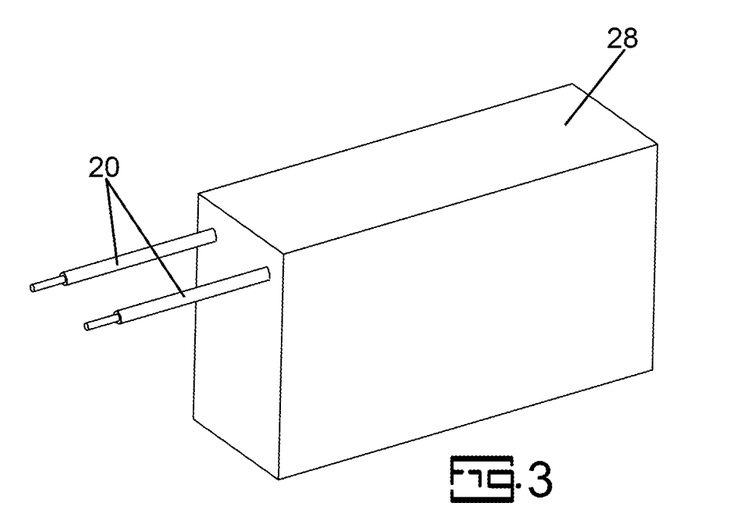
FIG. 3 is a perspective schematic view of an embodiment of the invention.

An embodiment of the invention is illustrated in schematic perspective view in FIG. 3 wherein the capacitor of FIG. 2 is embedded in a resin shell, 28, with only the wires, 20, extending therefrom.

Figure 4:
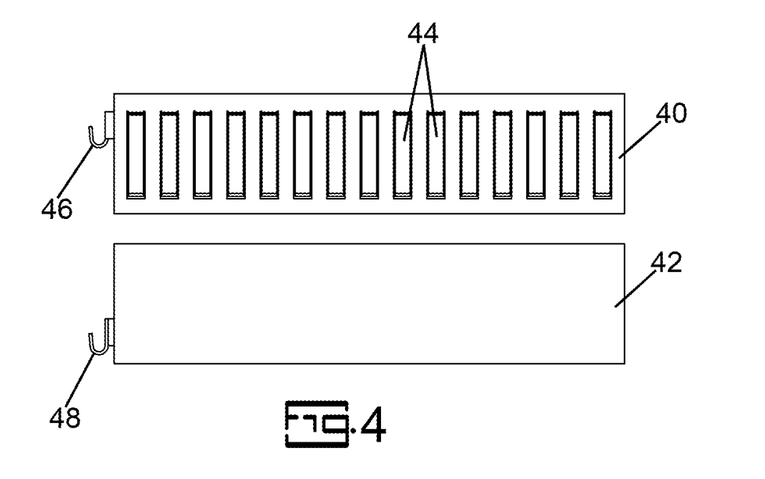
FIG. 4 is a perspective schematic view of leads of an embodiment of the invention.

An embodiment of the invention will be described with reference to FIGS. 4-7. In FIG. 4 an outer lead, 40, and inner lead, 42, are illustrated. The outer lead, 40, comprises optional, but preferred, solder pads, 44, and an electrical crimp, 46. The inner lead, 42, which may also have optional solder pads on one or both faces, also comprises an electrical crimp, 48. Mechanical crimps can be incorporated if desired.

Figure 5:
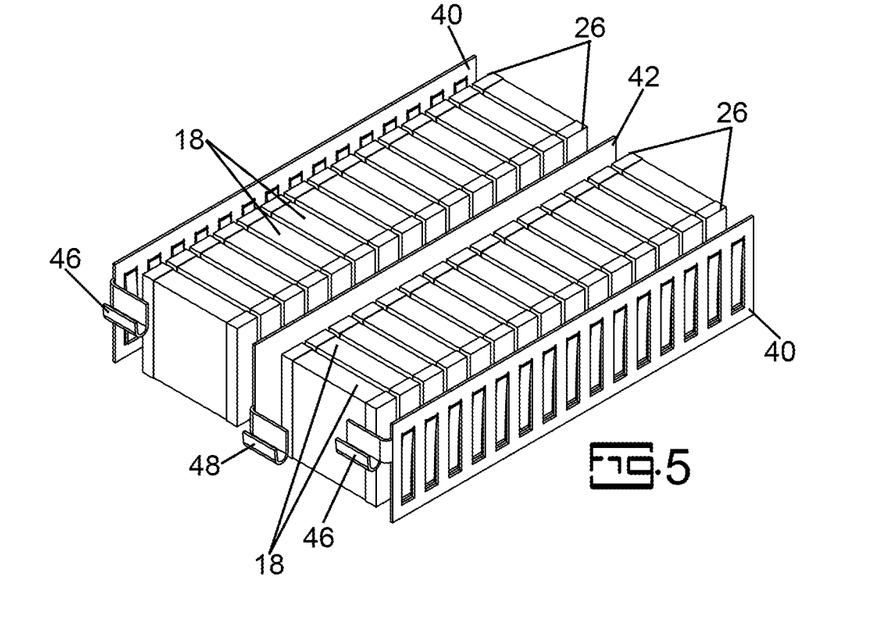
FIG. 5 is an exploded perspective schematic view of an embodiment of the invention.
Figure 6:
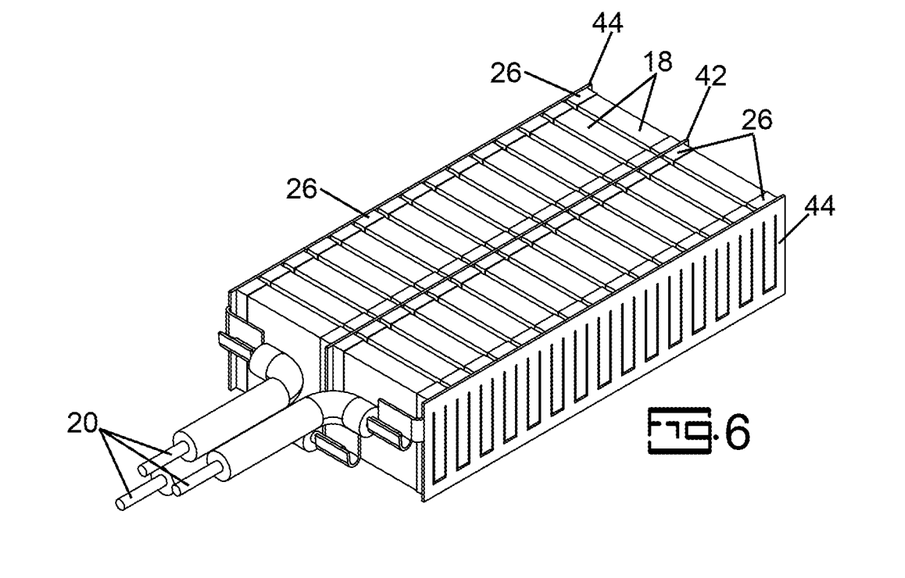
FIG. 6 is a perspective schematic view of an embodiment of the invention.
Figure 7:
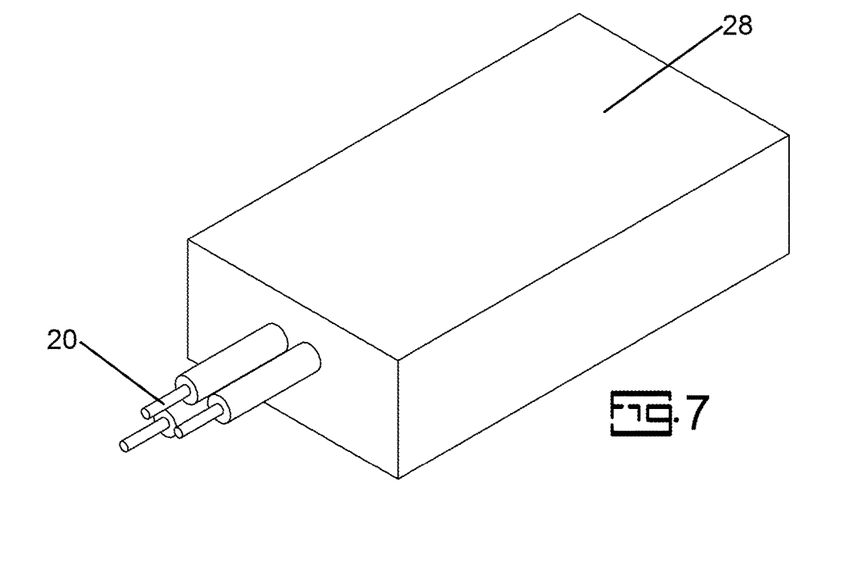
FIG. 7 is a perspective schematic view of an embodiment of the invention.

An embodiment of the invention utilizing the outer leads and inner lead of FIG. 4 is illustrated in FIGS. 5-7. In FIG. 5 an embodiment of the invention is illustrated in exploded perspective view wherein a plurality of MLCC's, 18, are arranged in two stacks. An inner lead, 42, is between the stacks and attached to each MLCC by an electrical bond, 26. Outer leads, 40, sandwich the two stacks there between and each outer lead is attached to the MLCC's of one stack by an electrical bond, 26. In FIG. 6, the embodiment of FIG. 5 is illustrated in perspective assembled view wherein wires, 20, are attached to the electrical crimp. As would be realized the two wires in electrical contact with the outer leads are of common polarity and are opposite polarity to the wire attached to the electrical crimp of the inner lead. The wires in electrical contact with the outer leads may be electrically connected to form a single capacitor or they may be used separately to have two capacitive couples in a common component. The embodiment illustrated in FIG. 6 can be embedded in an resin shell, 28, with only the wires 20, extending therefrom as illustrated in schematic perspective view in FIG. 7. As would be appreciated, a single stack can be employed sandwiched between two outer leads or a multiplicity of stacks can be assembled with inner leads between adjacent stacks wherein alternate leads are of common polarity.

Figure 8:
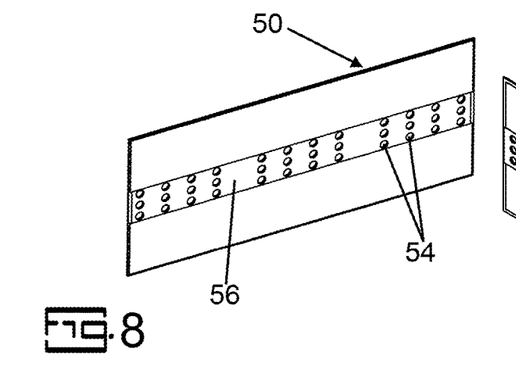
FIGS. 8 and 9 are outer and inner perspective schematic views of an embodiment of the invention.
Figure 9:
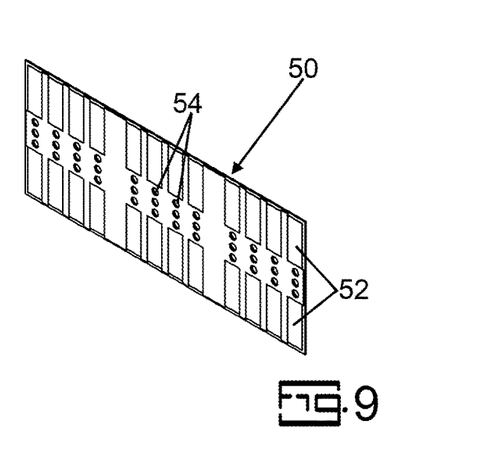
Figure 10:
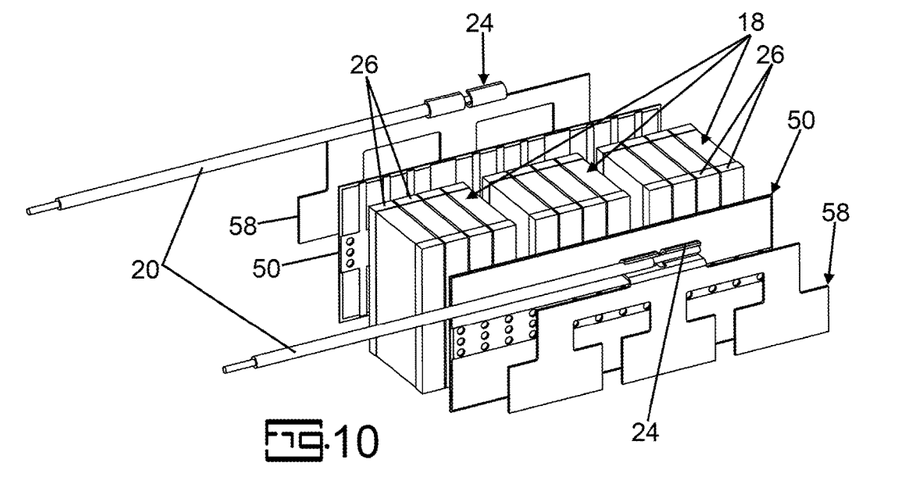
FIG. 10 is an explode perspective schematic view of an embodiment of the invention.
Figure 11:
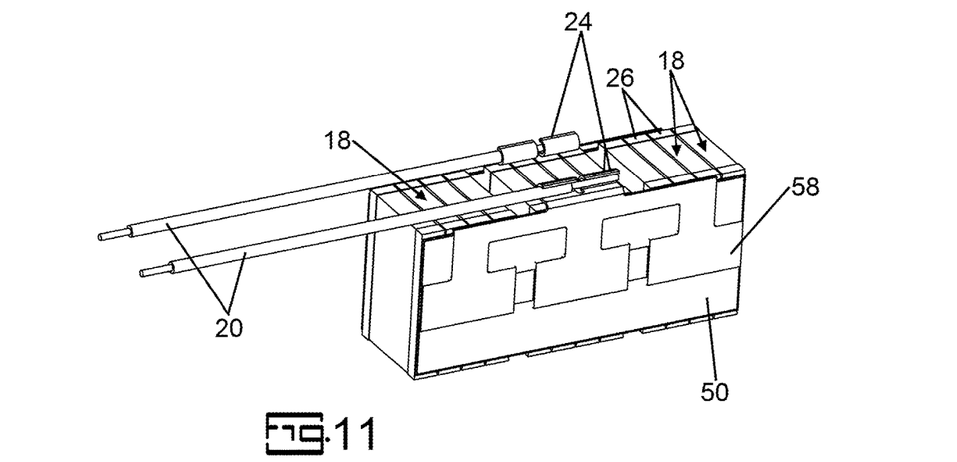
FIG. 11 is a perspective schematic view of an embodiment of the invention.

An embodiment of the invention will be described with reference to FIGS. 8-11. FIG. 8 is a schematic perspective outer view of a interposer, 50, of the invention and FIG. 9 is a schematic inner view of the interposer, 50, of FIG. 9. The interposer comprises capacitor traces, 52, on the inner side thereof which will form an electrical connection to a stack of MLCC's as will be further described herein. Vias, 54, through the interposer electrically connect the capacitor traces with a termination trace, 56, on the outer side of the interposer. FIGS. 10 and 11 are a schematic perspective exploded view and a schematic assembled view, respectively, of a capacitor wherein a stack of MLCC's, 18, are sandwiched between a pair of interposers, 50, such that each MLCC is electrically attached to at least one capacitor trace. A lead, 58, with an electrical crimp, 24, integral thereto is electrically connected to the termination trace of each interposer. A wire, 20, is then electrically connected to each electrical crimp. As would be realized to one of skill in the art the capacitor could be encased in a resin with only the wires extending therefrom. The embodiment of FIGS. 9-11 can be used with a single stack, as illustrated, or with multiple stacks, such as an upper and lower stack. An interposer reduces the coefficient of thermal expansion (CTE) between the lead frame and a stack of MLCC's when the interposer is placed between the lead frame and the stack of MLCC's. The interposer construction preferably comprises a Kapton® or epoxy glass composite having a copper front and back surfaces having a defined copper pattern specific to the pattern of the lead frame on the front side and a defined copper pattern specific to the terminations of the stack of MLCC's on the back side. Leads are soldered to the lead frame which is then assembled to the MLCC stack and the interposer.

Figure 12:
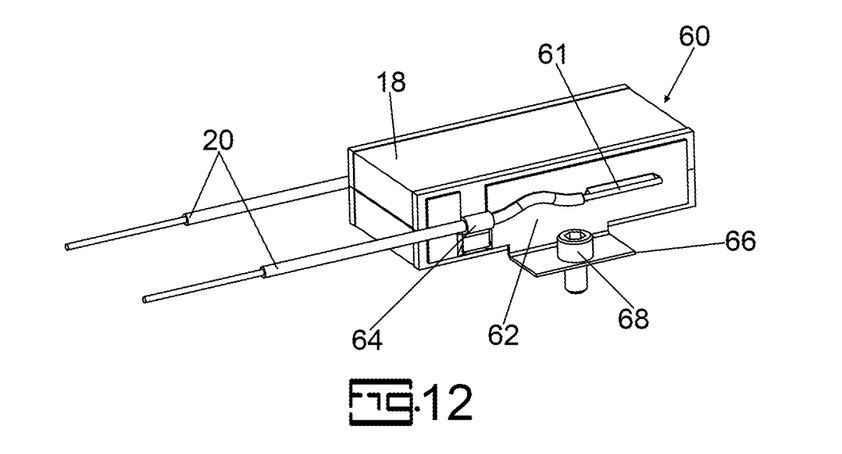
FIG. 12 is a perspective schematic view of an embodiment of the invention.
Figure 13:
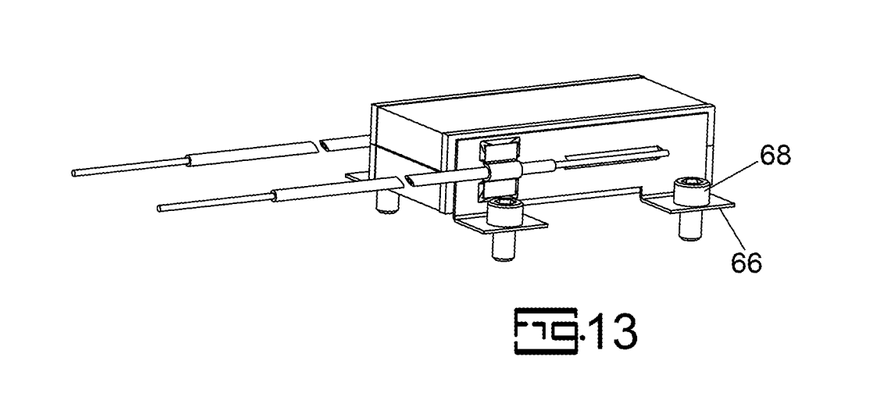
FIG. 13 is a perspective schematic view of an embodiment of the invention.

An embodiment of the invention is illustrated in FIG. 12 wherein a capacitor is illustrated in schematic perspective view. The capacitor, 60, comprises a stack of MLCC's, 18. A lead, 62, comprising a stamped crimp, 64, is electrically attached to the stack of MLCC's. The stamped crimp, 64, can be a mechanical crimp or an electrical crimp as described elsewhere herein. In a preferred embodiment a wire, 20, is secured by a mechanical crimp and the conductor of the wire is electrically bonded, 61, such as by soldering, to the lead. A second stamped crimp may form an electrical crimp for electrically connecting the wire. Between the stamped crimp, 64, and the electrical bond the lead the wire is preferably non-linear, such as in a loop or partial loop, thereby providing slack to accommodate any thermal expansion or contraction of the lead. An alternate embodiment is illustrated in FIG. 13, wherein the lead comprises a tab, 66, capable of receiving a pin, 68, there through. The pin can be an electrical or mechanical connection to a circuit.

Figure 14:
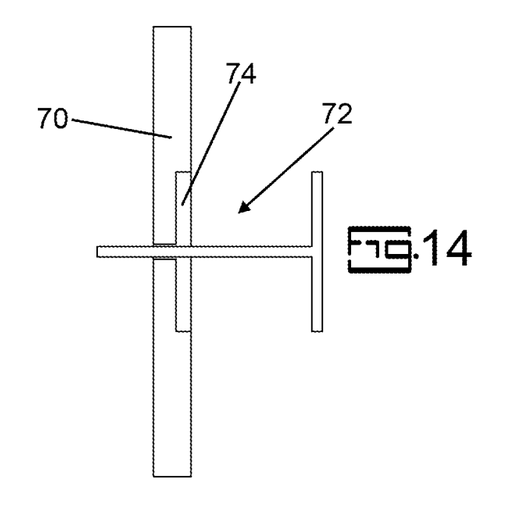
FIG. 14 is an explode side schematic view of an embodiment of the invention.
Figure 15:
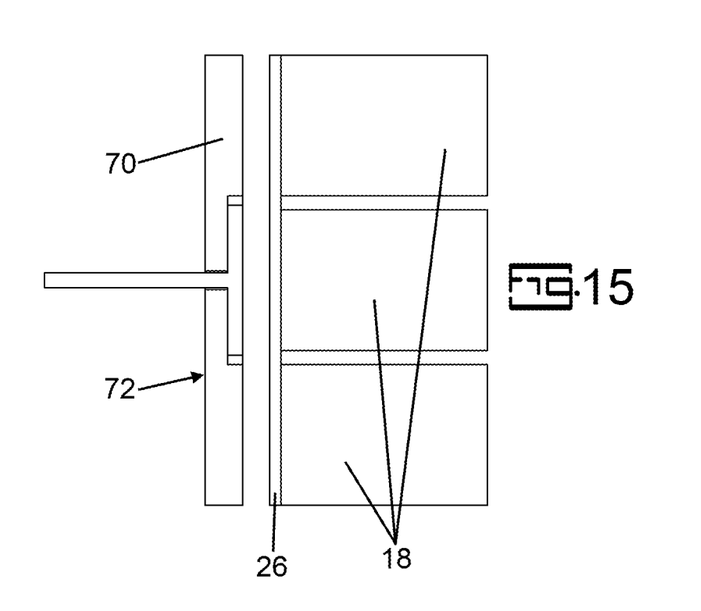
FIG. 15 is an explode side schematic view of an embodiment of the invention.

An embodiment of the invention will be described with reference to FIGS. 14-16. FIG. 14 is a schematic exploded side view of a lead, 70, with a headed wire, 72, extending there through also referred to as a cold-headed pin. A partial recess or countersink, 74, in the lead is preferred for receiving the head. The recess allows the pin to be inserted into the lead with the head flush, or recessed, from the surface of the lead. As illustrated in partial exploded side view in FIG. 15, the lead, 70, is attached to one side of a stack of MLCC's, 18, by an electrical bond, 26, to form a capacitor.

Figure 16:
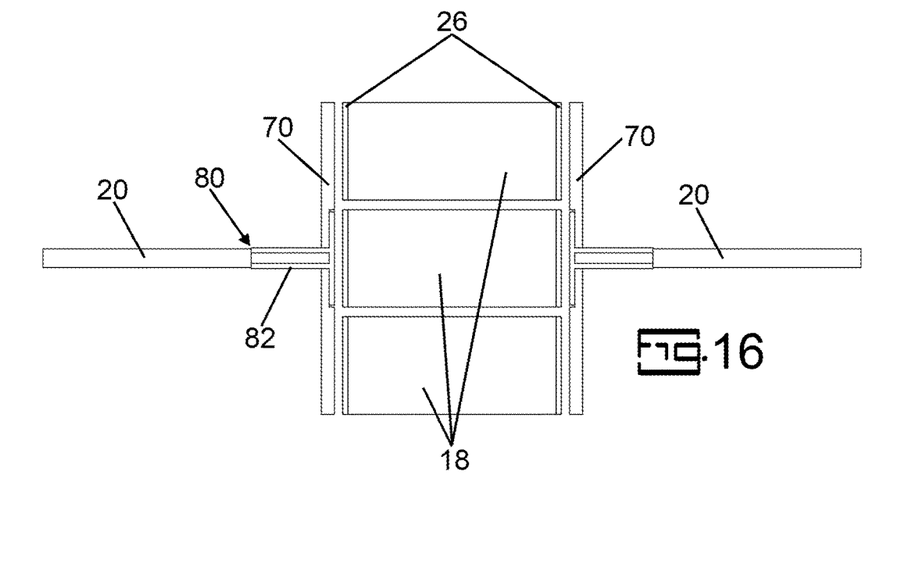
FIG. 16 is an explode side schematic view of an embodiment of the invention.
Figure 17:
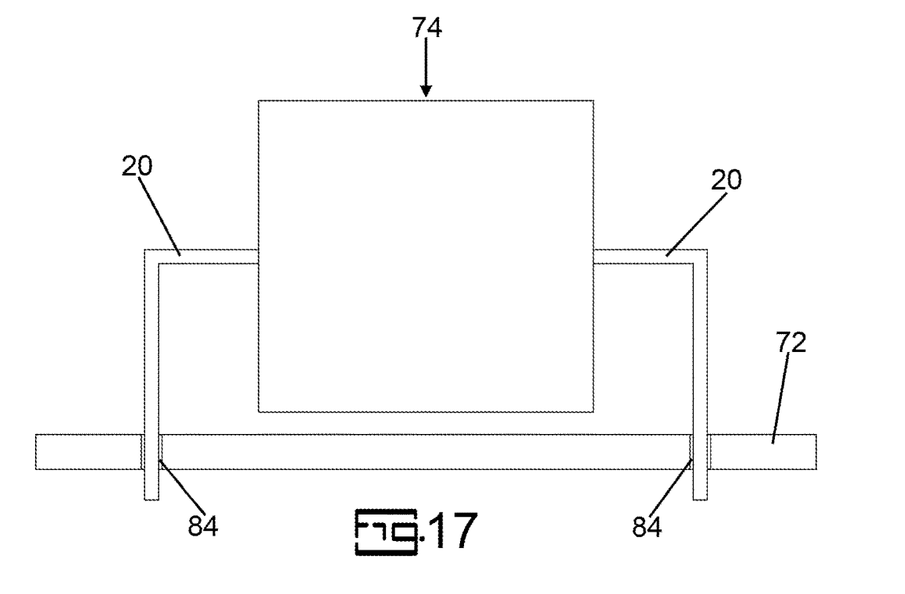
FIGS. 17 and 18 are side views of an embodiment of the invention.
Figure 18:
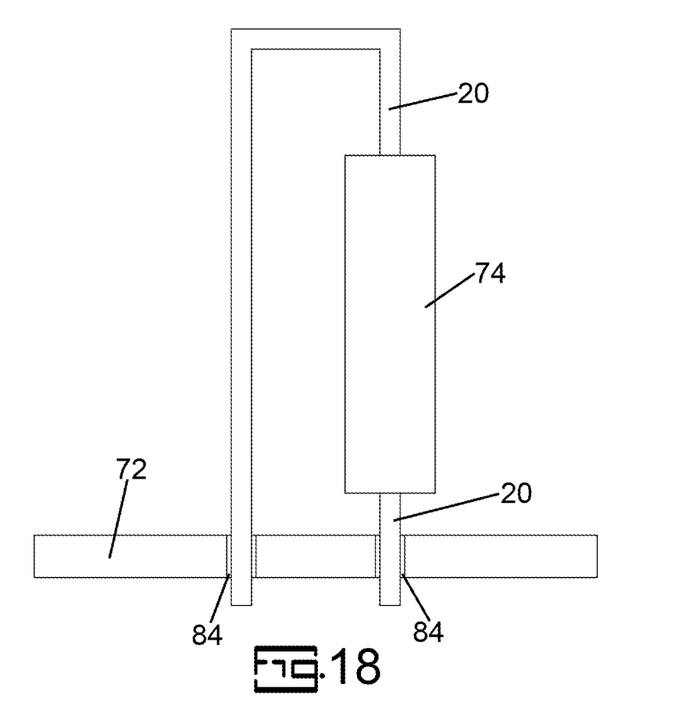

The lead illustrated in FIG. 14 can be used with a solderable eyelet, 80, as illustrated in schematic exploded view in FIG. 16. The conductor, 82, of a wire, 20, is then soldered to the eyelet. This design offers the capability of utilizing stranded wires for the flexible lead instead of a solid single wire. The capacitor, 74, can be mounted in an axial lead attach design with the wires parallel to the substrate, 72, preferably in vias 84, as illustrated in schematic side view in FIG. 17 or with the leads perpendicular to the substrate as illustrated in schematic side view in FIG. 18.

Figure 19:
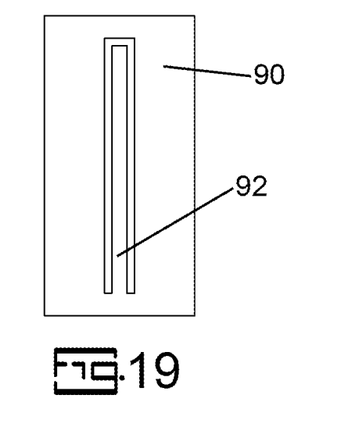
FIG. 19 is a front schematic view of an embodiment of the invention.
Figure 20:
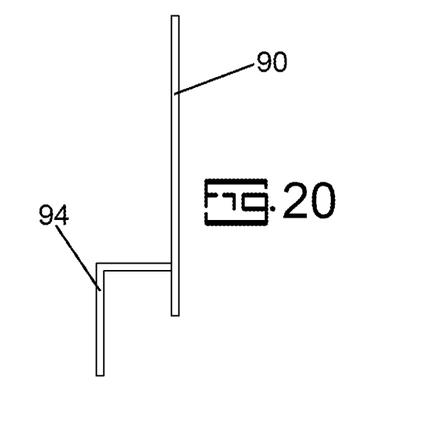
FIG. 20 is a front schematic view of an embodiment of the invention.

An embodiment of the invention is illustrated in FIGS. 19 and 20. In FIG. 19, a lead, 90, is shown in side view. The lead has a tab, 92, which can be bent as shown in FIG. 20 to form a pin mount, 94. The lead can then be used with a stack of MLCC's to form a capacitor as realized herein.

The internal electrodes are not particularly limiting herein. Base metal electrodes or precious metal electrodes can be used to demonstrate the invention. When base metal electrodes are used the dielectric, which is not particularly limiting, can be a ceramic which has a low temperature Coefficient of Capacitance (TCC) and preferably meets the EIA C0G standard (≤+/−30 ppm/° C.).

The lead is preferably chosen from a material selected from phosphor bronze, copper, alloys of copper such as but not limited to beryllium copper, Cu194 and Cu192, as well as lead frames consisting of ferrous alloys such as but not limited to Alloy 42 and Kovar.

The invention has been described with particular reference to preferred embodiments without limit thereto. One of skill in the art would realize additional embodiments and improvements which are not specifically enumerated but which are within the scope of the invention as specifically set forth in the claims appended hereto.

The invention claimed is:

1. A capacitor comprising at least one MLCC sandwiched between a first lead frame and a second lead frame wherein said first lead frame comprises at least one first integral lead crimp with a wire electrically attached to said first lead frame by said first integral lead crimp and said wire is further mechanically attached to said first lead frame by a second integral lead crimp.

2. The capacitor of claim 1 comprising a stack of MLCC's sandwiched between said first lead frame and said second lead frame.

3. The capacitor of claim 2 wherein said first lead frame comprises multiple connected leads with each connected lead of said connected leads attached to one external termination of an MLCC of said MLCC's.

4. The capacitor of claim 3 wherein said connected leads are electrically connected.

5. The capacitor of claim 1 wherein said first lead frame comprises a connected lead attached to an external termination of said MLCC.

6. The capacitor of claim 1 wherein said second lead frame further comprises a mechanical attachment.

7. The capacitor of claim 6 wherein said mechanical attachment is a second integral lead crimp.

8. The capacitor of claim 7 wherein said a second wire is in electrical contact with a second integral lead crimp and in mechanical attachment with said second integral lead crimp.

9. The capacitor of claim 8 wherein said wire is non-linear between said second integral lead crimp and said second integral lead crimp.

10. The capacitor of claim 1 comprising two MLCC stacks with said second lead frame between said stacks.

11. The capacitor of claim 10 further comprising a second first lead frame with said two stacks between said first first lead frame and said second first lead frame.

12. The capacitor of claim 1 wherein at least one of said first lead frame and said second lead frame comprises at least one solder tab.

13. The capacitor of claim 1 further comprising an interposer between said MLCC and said first lead frame.

14. The capacitor of claim 13 wherein said interposer comprises capacitor traces on one face and termination traces on an opposite face.

15. The capacitor of claim 14 wherein said interposer is electrically connected to an external termination of said MLCC by an electrical bond.

16. The capacitor of said 14 wherein said first lead frame is connected to said termination traces by an electrical bond.

17. The capacitor of claim 1 further comprising a pin wherein said pin is received in a void of said first lead frame.

18. The capacitor of claim 17 wherein said pin is an eyelet capable of receiving said soft lead.

19. The capacitor of claim 1 wherein said first lead frame further comprises a pin mount.

20. The capacitor of claim 1 wherein said first lead frame comprises a material selected from phosphor bronze, copper and ferrous alloys.

21. The capacitor of claim 20 wherein said first lead frame comprises a material selected from copper alloy, Alloy 42 and Kovar.

22. The capacitor of claim 20 wherein said first lead frame comprises a material selected from beryllium copper, Cu194 and Cu192.

23. The capacitor of claim 1 further comprising a resin encasement.

24. A device comprising the capacitor of claim 1.

25. A capacitor comprising at least one MLCC sandwiched between a first lead frame and a second lead frame wherein each of said first lead frame and said second lead frame comprises at least one first integral lead crimp with a soft lead attached to said first lead frame comprising a stack of MLCC's sandwiched between said first lead frame and said second lead frame wherein said first lead frame comprises multiple connected leads with each connected lead of said connected leads attached to one external termination of an MLCC of said MLCC's further comprising an expansion link between adjacent connected leads.

26. A method for forming a capacitor comprising:
    forming an MLCC stack wherein each MLCC of said MLCC stack comprises a first external termination and a second external termination;
    providing a first lead frame and a second lead frame wherein said first lead frame comprises a first integral crimp;
    attaching said first lead frame to said first external termination;
    attaching said second lead frame to said second external termination; and
    electrically attaching a wire to said first lead frame at said first lead crimp and mechanically attaching said wire at a second lead crimp.

27. The method for forming a capacitor of claim 26 wherein said first lead frame comprises a connected lead attached to an external termination of an MLCC.

28. The method for forming a capacitor of claim 26 wherein said first lead frame comprises multiple connected leads with each connected lead of said connected leads attached to one external termination of an MLCC.

29. The method for forming a capacitor of claim 28 wherein said connected leads are electrically connected.

30. The method for forming a capacitor of claim 28 wherein said first lead frame comprises a common rail attached to a least one said connect lead.

31. The method for forming a capacitor of claim 30 further comprising removing said common rail.

32. The method for forming a capacitor of claim 26 wherein said wire is non-linear between said first integral lead crimp and said second integral lead crimp.

33. The method for forming a capacitor of claim 26 comprising forming a second MLCC stack with said second lead frame between said MLCC stack and said second MLCC stack.

34. The method for forming a capacitor of claim 33 further comprising attaching a second first lead frame to said second MLCC stack.

35. The method for forming a capacitor of claim 26 further comprising placing an interposer between said MLCC and said first lead frame.

36. The method for forming a capacitor of claim 35 wherein said interposer comprises capacitor traces on one face and termination traces on an opposite face.

37. The method for forming a capacitor of claim 36 wherein said interposer is electrically connected to an external termination of said MLCC by an electrical bond.

38. The method for forming a capacitor of claim 36 comprising electrically bonding said first lead frame to said termination traces.

39. The method for forming a capacitor of claim 26 wherein said first lead frame further comprises a pin wherein said pin is received in a void of said first lead frame.

40. The method for forming a capacitor of claim 39 wherein said pin is an eyelet capable of receiving said wire.

41. The method for forming a capacitor of claim 26 wherein said first lead frame further comprises a pin mount.

42. The method for forming a capacitor of claim 26 wherein said first lead frame comprises a material selected from phosphor bronze, copper and ferrous alloys.

43. The method for forming a capacitor of claim 42 wherein said first lead frame comprises a material selected from copper alloy, Alloy 42 and Kovar.

44. The method for forming a capacitor of claim 42 wherein said first lead frame comprises a material selected from beryllium copper, Cu194 and Cu192.

45. The method for forming a capacitor of claim 26 further comprising encasing said capacitor in a resin.

46. A method for forming a capacitor comprising:
    forming an MLCC stack wherein each MLCC of said MLCC stack comprises a first external termination and a second external termination;
    providing a first lead frame and a second lead frame wherein said first lead frame comprises a first integral crimp;
    attaching said first lead frame to said first external termination;
    attaching said second lead frame to said second external termination; and
    attaching a wire to said first lead frame wherein said first lead frame comprises multiple connected leads with each connected lead of said connected leads attached to one external termination of an MLCC further comprising an expansion link between adjacent connected leads.

47. A capacitor comprising at least one MLCC sandwiched between a first lead frame and a second lead frame wherein each of said first lead frame and said second lead frame comprises at least one first integral lead crimp and a flexible lead electrically attached to said first integral lead crimp and said flexible lead is mechanically attached to a second integral lead crimp.

48. A device comprising the capacitor of claim 47.

* * * * *